(12) United States Patent
Jowkar et al.

(10) Patent No.: US 11,383,449 B2
(45) Date of Patent: Jul. 12, 2022

(54) DETERMINING EXCESS BUILD MATERIAL

(71) Applicant: HEWLETT-PACKARD DEVELOPMENT COMPANY, L.P., Spring, TX (US)

(72) Inventors: Mohammad Jowkar, Sant Cugat del Valles (ES); Yngvar Rossow Sethne, Sant Cugat del Valles (ES); Adrien Chiron, Sant Cugat del Valles (ES); Luis Arenas Rivera, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/608,329

(22) PCT Filed: Mar. 29, 2018

(86) PCT No.: PCT/US2018/025022
§ 371 (c)(1),
(2) Date: Oct. 25, 2019

(87) PCT Pub. No.: WO2019/190516
PCT Pub. Date: Oct. 3, 2019

(65) Prior Publication Data
US 2021/0291457 A1    Sep. 23, 2021

(51) Int. Cl.
*B29C 64/393* (2017.01)
*B33Y 10/00* (2015.01)
*B33Y 30/00* (2015.01)
*B33Y 50/02* (2015.01)
*B29C 64/321* (2017.01)
(Continued)

(52) U.S. Cl.
CPC .......... *B29C 64/393* (2017.08); *B29C 64/205* (2017.08); *B29C 64/321* (2017.08); *B29C 64/343* (2017.08); *B33Y 10/00* (2014.12); *B33Y 30/00* (2014.12); *B33Y 50/02* (2014.12)

(58) Field of Classification Search
CPC ... B29C 64/393; B29C 64/321; B29C 64/343; B29C 64/205; B33Y 10/00; B33Y 30/00; B33Y 50/02; B22F 10/30; B22F 10/31
See application file for complete search history.

(56) References Cited

U.S. PATENT DOCUMENTS 6,007,318 A * 12/1999 Russell ................. B33Y 30/00
425/130
7,045,738 B1    5/2006 Kovacevic et al.
7,291,002 B2   11/2007 Russell et al.
(Continued)

FOREIGN PATENT DOCUMENTS

| EP | 3181334 A1 | 6/2017 |
|----|------------|--------|
| WO | WO-2017009831 A1 | 1/2017 |
| WO | WO-2017095416 A1 | 6/2017 |

*Primary Examiner* — Joseph S Del Sole
*Assistant Examiner* — John Robitaille
(74) *Attorney, Agent, or Firm* — Hp Inc. Patent Development

(57) ABSTRACT

An example method to determine an excess of build material in 3D printing includes providing an amount of build material, spreading the amount of build material to form a layer of build material on a build platform and to leave any excess build material on an excess zone having visible marks thereon and analyzing the marks on the excess zone to determine an excess of build material at the excess zone.

15 Claims, 13 Drawing Sheets

(51) Int. Cl.
 *B29C 64/343* (2017.01)
 *B29C 64/205* (2017.01)

(56) References Cited

U.S. PATENT DOCUMENTS

| | | |
|---|---|---|
| 2002/0145213 A1 | 10/2002 | Liu et al. |
| 2008/0042321 A1 | 2/2008 | Russell et al. |
| 2014/0028531 A1 | 9/2014 | Ito et al. |
| 2016/0121399 A1 | 5/2016 | Buller et al. |
| 2016/0368214 A1 | 12/2016 | Sasaki et al. |
| 2017/0028642 A1 | 2/2017 | Ho et al. |

* cited by examiner

DETERMINING EXCESS BUILD MATERIAL

BACKGROUND

In 3D printing technology three-dimensional objects can be generated in a layer-wise manner. In some examples, layers of build material are successively formed on a build platform and portions of successive layers may be selectively solidified to form the layers of a three-dimensional object. In some examples, an amount of build material to be spread for forming each layer may vary due to the solidification process, ambient conditions or the specifications of the object to be formed.

DETAILED DESCRIPTION

Figure 1:
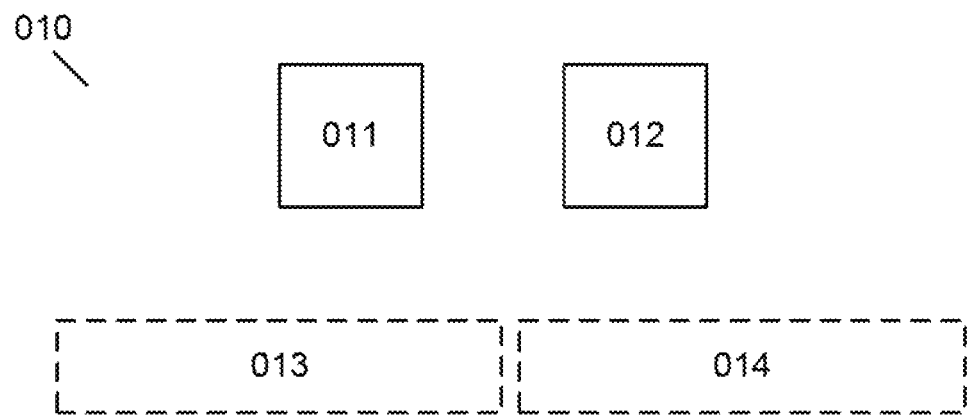
FIG. 1 schematically shows a side-view of an example of a system to determine an excess of build material.

Three-dimensional objects may be generated from build material. In some examples, build material may comprise dry and wet powders. Each powder particle may have a shape, e.g. spherical, ellipsoidal, fiber-shaped, polyhedron-shaped or another shape, and dimension. In some examples, build material may be plastic powder, such as nylon, polyamides polypropylene, or metal powder, ceramic powder or another composition. In some examples, build material may fuse, sinter or melt at a temperature. In some examples, build material may stick, adhere or harden by applying a binder or another reactive agent. Thus, in a 3D printing process each layer of build material can be selectively solidified or coagulated by selectively applying energy, heat, radiation, agents, binders or other liquid compositions onto sections of the layer, so that layer-wise a three-dimensional object is formed.

In examples of 3D printing technology, layers of build material may be formed on a build platform. The build platform may be a movable platform on which successively layers of build material are to be formed on top of each other. For example, a build platform may be adjustable in height and may be moved downwards before a new layer of build material is formed on top of the previous layer using, for example with a build material dispensing device.

In some examples, a build material dispensing device may form consecutive layers of build material of substantially the same thickness. In some examples, a build material dispensing device may be provided with an amount of build material to be spread over the build platform or a previously formed layer to form a consecutive layer of build material.

In some examples, the amount of build material to form a layer of build material on the build platform may vary. For example, due to variations in the solidification process, ambient conditions or the specifications of the three-dimensional object to be formed, more or less build material may be needed to form each layer of build material within a build job or between different build jobs. In some examples, humidity of the ambient environment may modify how compact build material can be spread to form a layer. In some examples, fused or solidified portions of a previous layer of build material may sink down, or compact, compared to non-solidified portions and thus more build material may be needed to form the consecutive layer of build. In some examples, an estimated amount of build material may be provided to be spread to form a layer of build material. In some examples, excess build material may remain after spreading a layer of build material. For example, remaining excess build material may have to be collected or re-cycled. In some examples, no excess build material may remain after spreading a layer of build material, for example if an insufficient quantity of build material was provided to form the layer of build material.

Examples described herein provide a convenient solution for determining an amount of excess of build material remaining after a quantity of build material is spread over a build platform. In some examples, based on the determined amount of excess build material, an amount of build material to be provided for forming the next layer may be adjusted. It may be desired to adjust an amount of build material to be provided for the next layer so that less excess build material remains after forming the next layer or so that sufficient build material is to be provided for forming the next layer. In some examples, an excess of build material may be determined in a calibration process. In some examples, an excess of build material may be determined for each layer of build material or after a number of layers have been formed.

Figure 2:
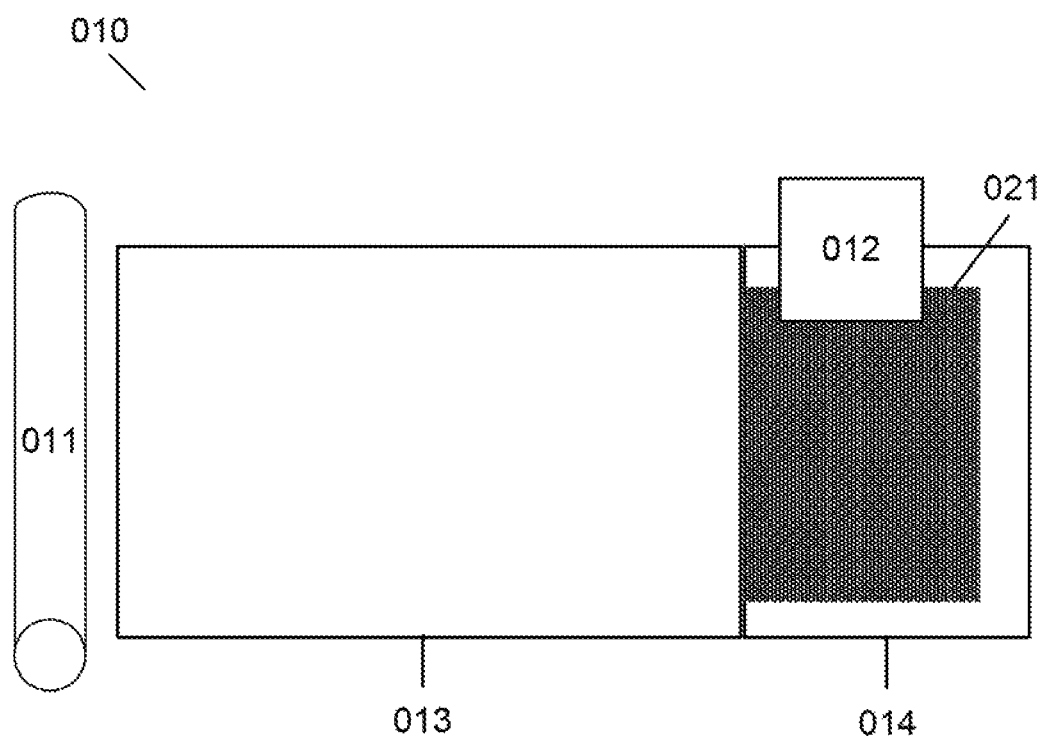
FIG. 2 schematically shows a top-view of an example of a system to determine an excess of build material.

FIG. 1 schematically shows a side-view and FIG. 2 schematically shows a top-view of examples of a system (010) to determine an excess of build material. The system (010) comprises a build material dispensing device (011) to spread a layer of build material on a build platform (013) of a 3D printer. For example, a layer of build material is formed on top of a build platform (013) or on top of a previous layer of build material defining a build area. The build material dispensing device (011) is to leave any excess of build material on an excess zone (014) or to cause any excess build material to overflow onto an excess zone (014). The system (010) comprises a detection module (012) to detect a degree of overflow of build material covering a pattern (021) provided on an excess zone (014).

The system (010) may further comprise an excess zone (014) on which the visible pattern (021) may be provided, as illustrated in FIG. 2. Excess build material can overflow from a build platform (013) of a 3D printer onto the excess zone (014) when build material is dispensed on the build platform (013) and may cover completely, or partially, the provided pattern (021). The excess zone (014) and the build platform (013) may be parts of a 3D printer or may be parts of a removable build unit of a 3D printer. In some examples, the build material dispensing device (011) and the detection module (012) may be parts of a 3D printer.

An excess zone (014) may be a zone adjacent to a build platform (013), such as adjacent to the build area on which the layers of build material are to be formed and sections thereof are to be solidified. In an example, the excess zone (014) may be planar with the build area. In some examples, an excess zone (014) may be a zone to collect excess build material from the build platform (013) after forming a layer of build material thereon. In some examples, the build material dispensing device (011) may leave any excess build material on the excess zone (014) after dispensing an amount of build material to form a layer of build material on the build platform (013). In some examples, build material left or caused to overflow onto the excess zone (014) may be collected to provide build material for forming the next layer. An excess zone (014) may be part of the build platform (013) or may be a separate component of a 3D printer or of a removable build unit. In some examples an excess zone (014) may be a platform to leave excess build material thereon, a bucket or container having an upper surface to leave excess build material thereon, or may be a solidified or non-solidified surface of build material to leave excess build material thereon.

The visible, or optically readable, pattern (021) provided on the excess zone (014) may be a pattern or marks distinguishable from excess build material left on the excess zone (014). For example, the provided pattern (021) may be of a different color than build material or may have other optical properties to differentiate the pattern (021) from build material. The pattern (021) may be planar to the surface of the excess zone (014) or may flush with the excess zone (014) and in some examples, the pattern (021) may be a pattern with different heights or may be raised with respect to the excess zone (014). In some examples, the pattern (021) may be engraved, printed, imprinted or otherwise provided on the excess zone (014). In some examples, the visible pattern (021) is permanently imprinted on the excess zone (014). In some examples, the visible pattern (021) is provided on the excess zone (014) during a calibration operation performed by a 3D printer, after forming each layer or repeatedly after forming a number of layers of build material. In some examples, the visible pattern (021) may be provided on a sheet of paper or another material on top of the excess zone (014). In some examples, the visible pattern (021) may be removable from the excess zone (012). The visible pattern (021) may be on a portion of the excess zone (014) or may cover the whole excess zone (014). For example, the pattern (021) may be on parts of the excess zone (014) where build material is expected to overflow thereon.

A build material dispensing device (011) is a device to dispense or spread an amount of build material over a build platform (013) to form a layer of build material thereon. Any excess build material may be left on or may be caused to overflow onto the excess zone (014) by the dispensing device (011). For example, a build material dispensing device (011) may be a blade, a vane, an archimedes unit, a hopper, a nozzle or a roller, as depicted in FIG. 2, to spread an amount of build material so that a layer of build material is formed on the build platform (013). In some examples, an amount of build material may be provided at a side of a build platform (013) and the build material dispensing device (011) may be to scan over the build platform (013) to spread the provided amount of build material over the build platform (013). For example, the build material dispensing device (011) may be scannable along a dimension of the build platform (013) and may extend over the perpendicular dimension of the build platform (013), so that in one pass of the dispensing device (011) over the platform (013) a layer of build material can be formed, such as a roller illustrated in FIG. 2. In some examples, a build material dispensing device (011) may pass more than one time over the build platform (013) to form a layer of build material and in some examples, a dispensing device (011) is scannable over more than one dimension of the build platform (013).

In some examples, a build material dispensing device (011) may form layers of build material having substantially the same thickness. In some examples, a build material dispensing device (011) may vary the thickness of a layer of build material or may spread a varying amount of build material to form a layer. The thickness of a layer of build material may depend on the height of the dispensing device (011) relative to the build platform (013), such as when forming a layer with a roller, a hopper or a blade. In some examples, the thickness of a layer of build material may depend on the velocity of the dispensing device (011) when scanning over the build platform (013) or may depend on the flowability or viscosity of build material dispensed by the dispensing device (011).

Figure 3:
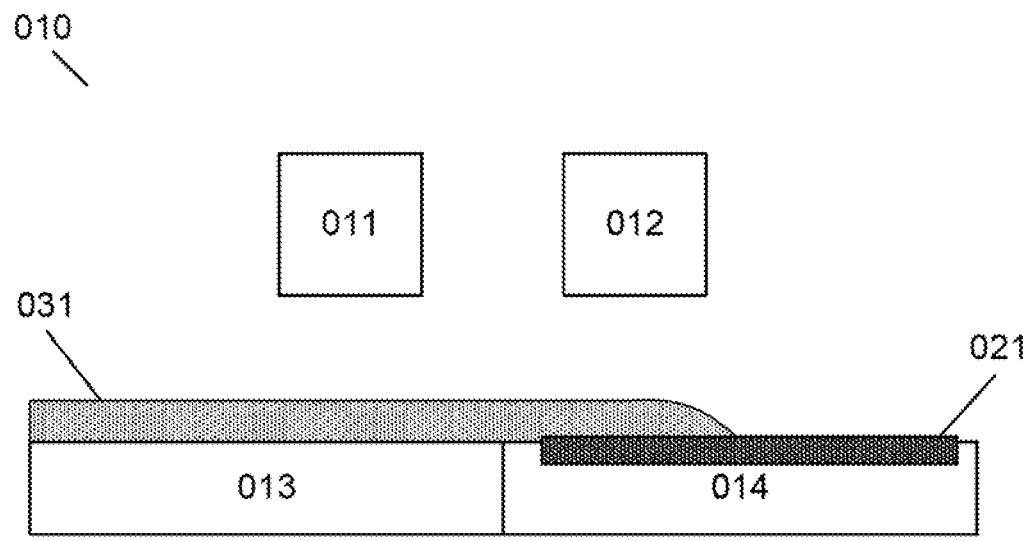
FIG. 3 schematically shows a side-view of an example of a system to determine an excess of build material and an example overflow of build material.

In some examples, the amount of build material provided for forming the layer is an amount greater than a minimum amount of build material. For example, a minimum amount may be a sufficient amount of build material to spread a layer of build material on the build platform (013) covering the whole build platform (013) without overflowing on an excess zone (014). In some examples, a minimum amount may be set at a specific amount of build material or may be defined at a specific amount of underflow or overflow. If more build material than a minimum amount is provided, the dispensing device (011) may leave any excess build material on the excess zone (014) or may cause any excess build material to overflow onto the excess zone (014). For example, the dispensing device (011) spreads the excess build material over the excess zone (014) to form a layer of build material (031) overflowing from the build platform (013) onto the excess zone (014), such as in the examples depicted in FIG. 3 and FIG. 4 which schematically show a side-view and a top-view of an example system (010).

In some examples, the dispensing device (011) scans over the build platform (013) and over the excess zone (014), e.g. at constant height, to form a layer of build material (031) on top of the build platform (013), or on top of a previous layer, and the excess zone (014). As shown in the example in FIG. 3 and FIG. 4, excess build material left on the excess zone (014) may cover the provided pattern (021). For example, the pattern (021) may be completely or partially covered by excess build material. In some examples, the surface of the layer of build material (031) formed on top of the build platform (013) and, in case of an overflow, on top of the excess zone (014), may be at a substantially constant height.

Figure 4:
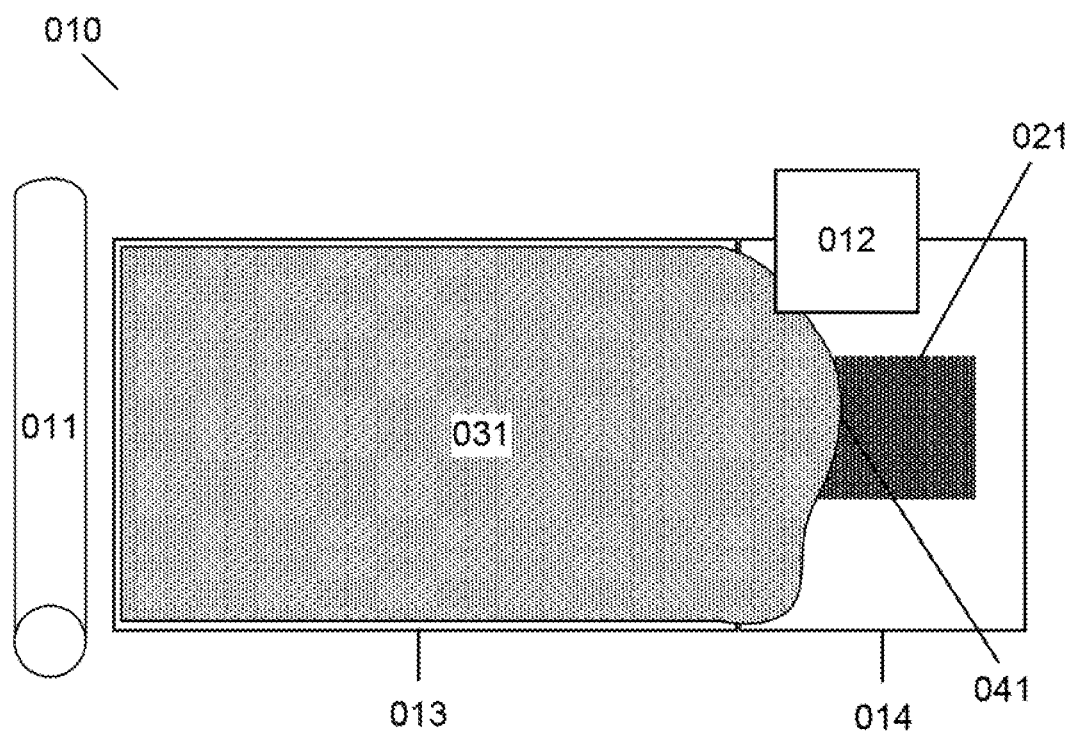
FIG. 4 schematically shows a top-view of an example of a system to determine an excess of build material and an example overflow of build material.

In some examples, an overflow of build material on the excess zone (014) may form a tongue-shaped side of the layer of build material (031), such as when spreading an amount of build material with e.g. a roller as depicted in FIG. 4 or a blade. A tongue-shaped side of a layer of build material (031) may have a tip (041), e.g. in a center portion of the tongue-shaped side of the layer of build material (031). In some examples, the pattern (021) may be provided on portions of the excess zone (014), so that a tip (041) of a side of the layer of build material (031) may be expected to overflow onto the pattern (021) when excess build material is left on the excess zone (014).

Figure 5:
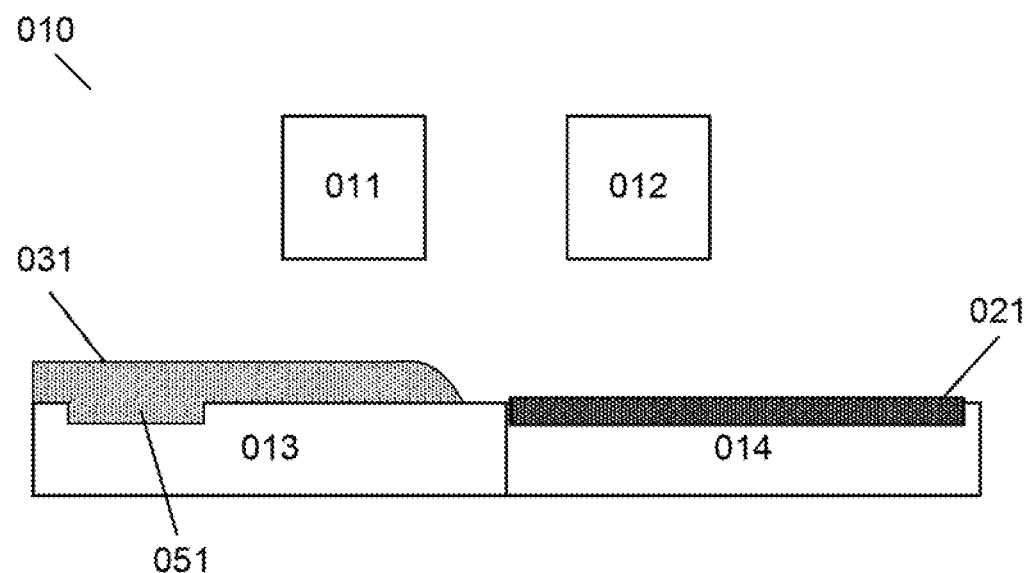
FIG. 5 schematically shows a side-view of an example of a system to determine an excess of build material and an example underflow of build material.
Figure 6:
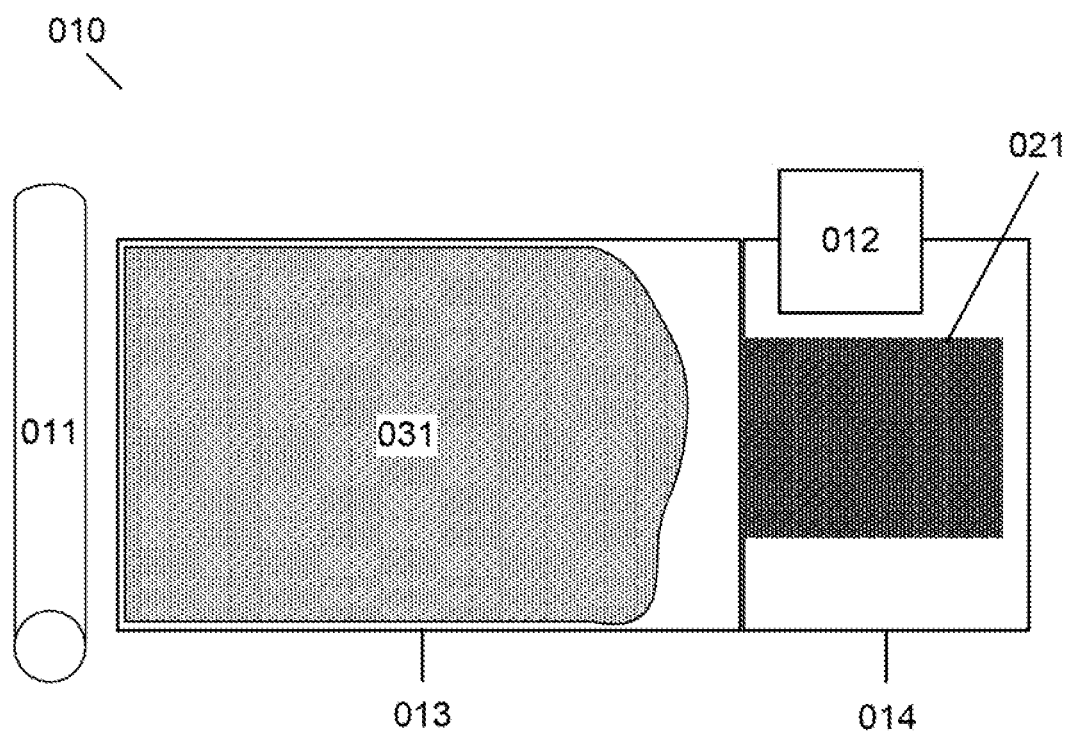
FIG. 6 schematically shows a top-view of an example of a system to determine an excess of build material and an example underflow of build material.

In some examples, the amount of build material provided to spread with the dispensing device (011) to form a layer is less than a minimum amount of build material, e.g. less than an amount needed to form a whole layer of build material on top of the build platform (013) or on top of a previous layer. For example, portions (051) of the previous layer of build material may be sunk down so that a greater amount of build material is needed to form the subsequent layer (031) than has been provided, as illustrated in FIG. 5. In that example, the dispensing device (011) may spread the amount of build material over the build platform (013) or over a previous layer and the formed layer of build material (031) is not covering the build platform (013) or the previous layer completely or the provided amount of build material is not sufficient to leave any excess build material on the excess zone (014). For example, FIG. 5 and FIG. 6 schematically show a side-view and a top-view of an example system (010) and illustrate an example underflow of a formed layer of build material (031), wherein the layer (031) may not cover the excess zone (014) or the visible pattern (021) provided on the excess zone (014).

A detection module (012) is to determine any excess amount of build material overflowing onto the excess zone (014) and covering the provided pattern (021) on the excess zone (014). In some examples, a detection module (012) may be scannable over at least the pattern (021) provided on the excess zone (014) to analyze the pattern (021) and to detect a degree of overflow of build material. In some examples, the detection module (012) may be stationary and may be able to analyze the pattern (021) on the excess zone (014) without scanning. A detection module (012) may be to detect optical properties, other radiation properties, e.g. UV radiation, heat radiation, or positional properties, such as height differences of the excess zone (014) and the pattern (021).

In some examples, a detection module (012) may comprise an optical sensor or a camera to measure optical properties from the excess zone (014) and the pattern (021) provided thereon. A detection module (012) may comprise a series of electro-optical sensors, charge-coupled devices (CCD), active pixel sensors, CMOS sensors, image sensors, photoresistors, photodiodes, optical fiber sensors, wavelength sensors, etc. In some examples, a detection module (012) may comprise an illumination source, e.g. a LED array. For example, an optical sensor may be to detect marks or parts of the provided pattern (021) not covered with any excess of build material on the excess zone (014). For example, the provided pattern (021) may have different optical properties than any excess build material which may cover the pattern (021). In some examples, marks or lines of the pattern (021) may have different optical properties than the surface of the excess zone (014) itself. For example, any excess build material covering the pattern (021) may have the same optical property as the surface of the excess zone (014) without pattern or marks thereon. In some examples, the detection module (012) may comprise an optical sensor to determine optical properties, such as color or reflected intensity, from the excess zone (014). For example, the provided pattern (021) may be dark, such as black and the build material may be bright, such as white. In some examples, the surface of the excess zone (014) without any pattern or marks provided thereon may be bright, such as white.

Based on the measured optical properties from the excess zone (014) a detection module (012) may be to determine a degree of overflow of build material. In some examples, the detection module (012) may be to determine a degree of overflow of build material based on a measurement of the detection module (012). For example, based on the measured optical properties from the excess zone (014) a detection module (012) may be to determine if there is an overflow of build material or an underflow of build material. In some examples, based on the measured optical properties from the excess zone (014) a detection module (012) may be to quantify an amount, volume or area of excess build material covering the pattern (021) and the excess zone (014). For example, by comparing the pattern (021) provided on the excess zone (014) before forming a layer of build material with the optical properties detected by the detection module (012) after forming the layer of build material, a degree of overflow of build material onto the excess zone (014) may be determined. In other examples, a user may analyze the pattern (021) and determine from the pattern (021) not covered by build material an overflow of build material on the excess zone (014).

In some examples, the provided pattern (021) or marks on the excess zone (014) may comprise at least one set of separate lines on the excess zone (014). In some examples, a set of lines may be one line or more than one line. For example, lines of a set of lines of the pattern (021) may comprise at least one of lines parallel to a side of the build area, the build area defining the area on the build platform on which the layer is to be formed, or lines inclined by an angle with respect to a side of the build area. In some examples, lines of a set of lines of the pattern (021) may comprise lines parallel to a side of the excess zone (014) or lines inclined by an angle with respect to a side of the excess zone (014). A set of parallel, separated lines of the pattern (021) may be separated by a constant distance or by a varying distance and the lines may cover the whole excess zone (014) or at least part of the excess zone (014), such as a center portion of the excess zone (014) or a portion whereon build material is expected to overflow. For example, the pattern (021) may comprise "N"-shaped, "X"-shaped, "I"-shaped, "-"-shaped lines or a combination thereof.

Figure 7A:
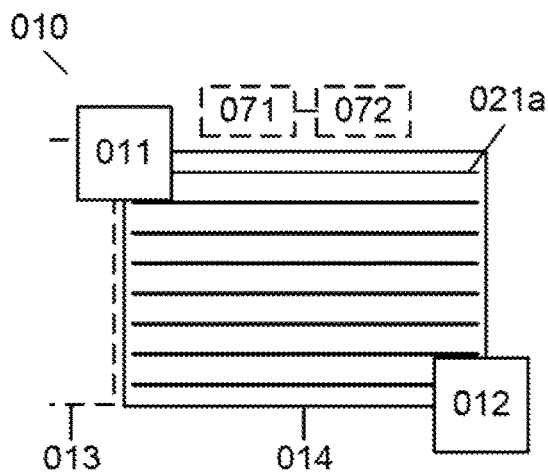
FIGS. 7a-7f schematically show a top-view of examples of a system to determine an excess of build material.
Figure 7B:
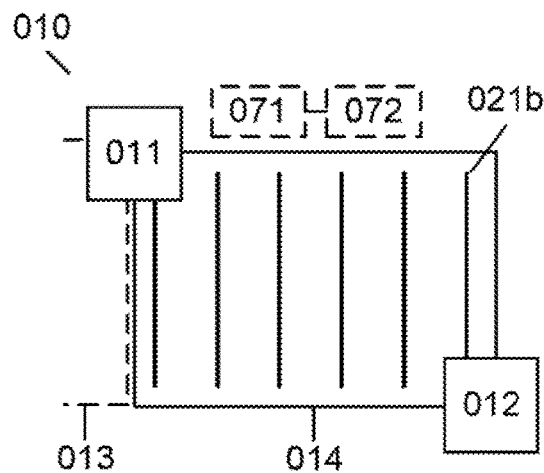
Figure 7C:
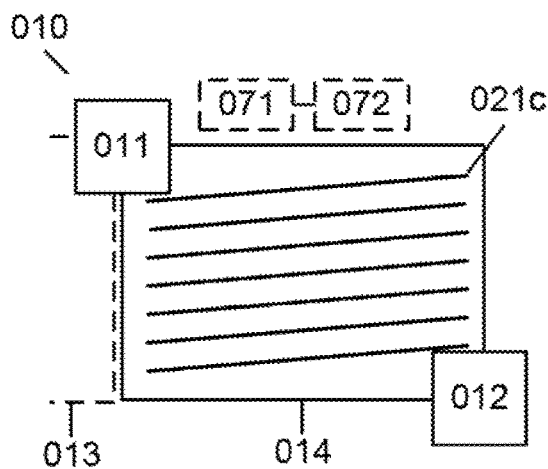
Figure 7D:
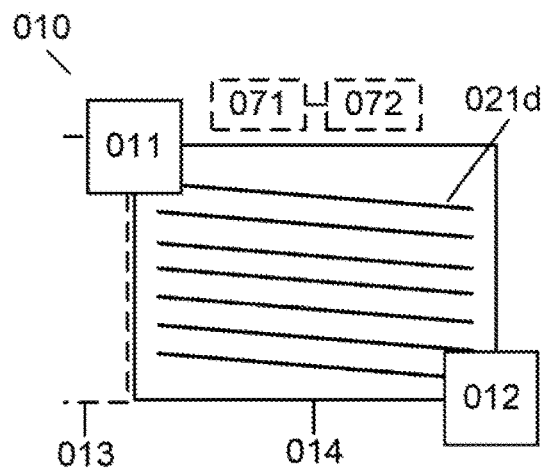
Figure 7E:
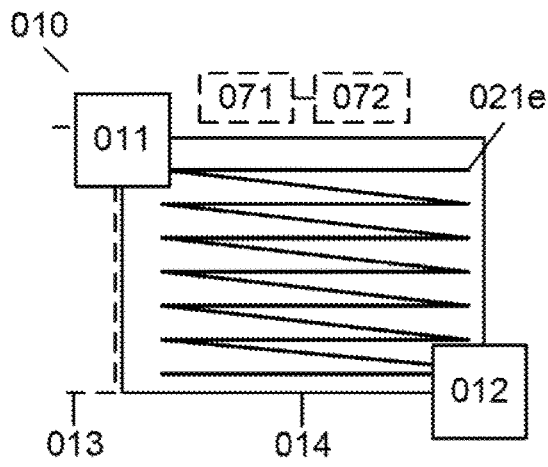
Figure 7F:
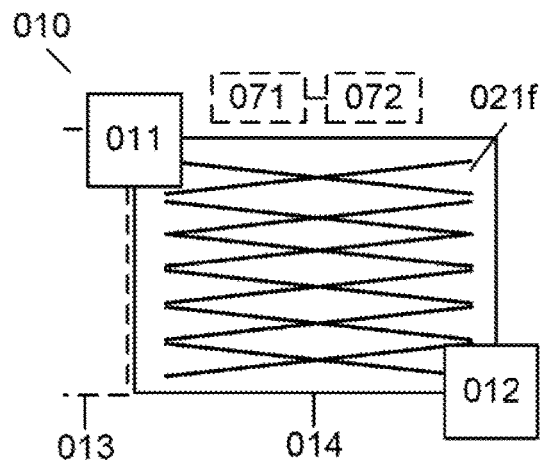

FIGS. 7a and 7b schematically each show a pattern (021a, 021b) of a set of lines separated by a distance and each line of the set being arranged parallel to a side of the excess zone (014). FIGS. 7c and 7d schematically each show a pattern (021c, 021d) of a set of lines separated by a distance and each line of the set is oblique to a side of the excess zone (014). In some examples, lines of the pattern (021) may be diagonal over the excess zone (014). In some examples, the pattern (021) may comprise various sets of parallel, separated lines, each set defined by a different angle of the lines within the set with respect to a side of the excess zone (014) or build platform (013). FIGS. 7e and 7f schematically show each a pattern (021e, 021f) of two sets of lines each, for example by combining at least two patterns of FIG. 7a-7d.

In some examples, system (010) to determine excess build material may further comprise a print head (071) to print the pattern (021) on the excess zone (014). The print head (071) may comprise a delivery structure and nozzles to dispense a printing fluid onto the excess zone (014). For example, the print head (071) may be an ink-jet print head to print a visible pattern (021) or marks on the excess zone (014). In some examples, the print head (071) may be scannable over the excess zone (014) to print a pattern (021) thereon. For example, the print head (071) may be scannable over the excess zone (014) to print a pattern (021) before a layer of build material is to be formed by the dispensing device (011) or any excess build material is to be left on the excess zone (014). In some examples, the print head (071) is to dispense black ink or another ink composition having a different color than build material. In some examples, the print head (071) may be used in a 3D printing process to dispense agent, e.g. fusing agent or binder agent. The print head (071) may be controlled by a controller (072), such as a micro-controller, an integrated circuit, an embedded system or a controller as discussed for FIG. 13, having circuitry to control the print head (071) to print a pattern (021) on the excess zone (014), as for example depicted in the examples of FIG. 7a-7f.

In some examples, the system (010) to determine an excess of build material may further comprise a dosage device. The dosage device is to provide an amount of build material, so that the build material dispensing device (011) can spread the provided amount over a build platform (013) and form a layer of build material (031). A dosage device may be to provide an amount of build material at a side of the build platform (013). In some examples, a dosage device may be a funnel, a feed hopper, a vane, a supply platform, an archimedes screw, a vibration feeder, a pneumatic system, a volumetric closer or another device to provide an amount of build material for spreading a layer of build material in a 3D printer. In some examples, the amount of build material provided by the dosage device may be adjustable.

In some examples, the amount of build material provided by the dosage device may be adjustable based on a quantified amount of excess build material. For example, the dosage device may be controlled, such as by a controller (072), to provide an amount of build material modified based on the degree of overflow of build material on the excess zone (014) determined by the detection module (012). For example, based on a quantified volume of excess build material on the excess zone (014), the dosage device may be to provide more, less or the same amount of build material for forming the next, or a subsequent, layer of build material. In some examples, the quantified volume of excess build material may be zero when no overflow of build material onto the excess zone (014) occurs, such as an underflow, or when excess of build material does not surpass a limit. In those examples, the dosage device may be controlled to provide more build material for forming a next, or a subsequent layer. In some examples, the quantified volume of excess build material may be larger than zero when overflow of build material onto the excess zone (014) occurred or when excess build material surpasses a limit. In those examples, the dosage device may be controlled to provide less build material relating to the quantified volume of excess build material.

In some examples, the detection module (012) comprises an optical line sensor or an array of line sensors to detect lines, e.g. a set of parallel lines as illustrated in FIGS. 7a-7f, of the pattern (021) on the excess zone (014). For example, an optical line sensor may be to measure a signal of reflected intensity from the excess zone (014), e.g. in relation to the sensors position when scanning over the excess zone (014). The signal measured by the optical line sensor may relate to the pattern (021) not covered by an overflow of build material. The optical signal measured by the line sensor in relation to excess build material covering the excess zone (014) and the surface of the excess zone (014) itself without any pattern or marks thereon may be substantially the same. For example, the surface of the excess zone (014) may have substantially the same reflectance as a layer of build material (031), and wherein the pattern (021) may have a different reflectance.

Figure 13:
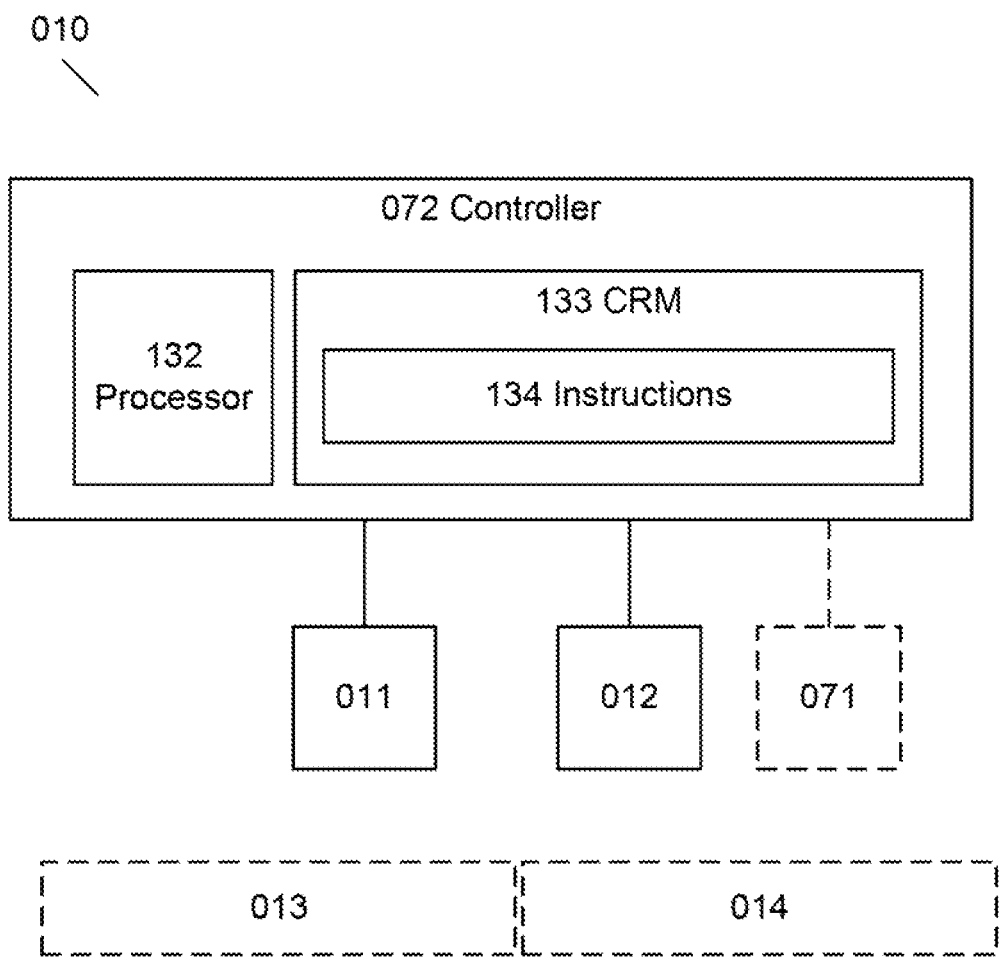
FIG. 13 schematically shows an example of a computer readable storage medium comprising instructions to determine excess of build material, the instructions executable by a processor.

In some examples, the detection module (012) may comprise, or may be coupled to, a controller, such as a microcontroller, an integrated circuit, an embedded system or a controller of a 3D printer related to system (010), e.g. controller (072) in FIGS. 7a-7f or a controller described for FIG. 13. In some examples, the controller may comprise circuitry to control and receive signals from sensors of the detection module (012). For example, the controller may be to quantify an excess amount or volume of build material on the excess zone (014), e.g. based on the detected lines by an optical line sensor. For example, the controller may determine based on the measurement of the optical line sensor the number of lines of pattern (021) not covered by excess build material. For example, the controller may calculate based on the detected lines of pattern (021) an area of the excess zone (014) covered with any excess build material. In some examples, based on the thickness of a layer of build material (031) a volume of excess build material may be quantified by the controller after determining the area covered with excess build material. In some examples, the height of the build material dispensing device (011) with respect to the surface of the excess zone (014) and the build platform (013) may define a thickness of a layer of build material (031).

Figure 8:
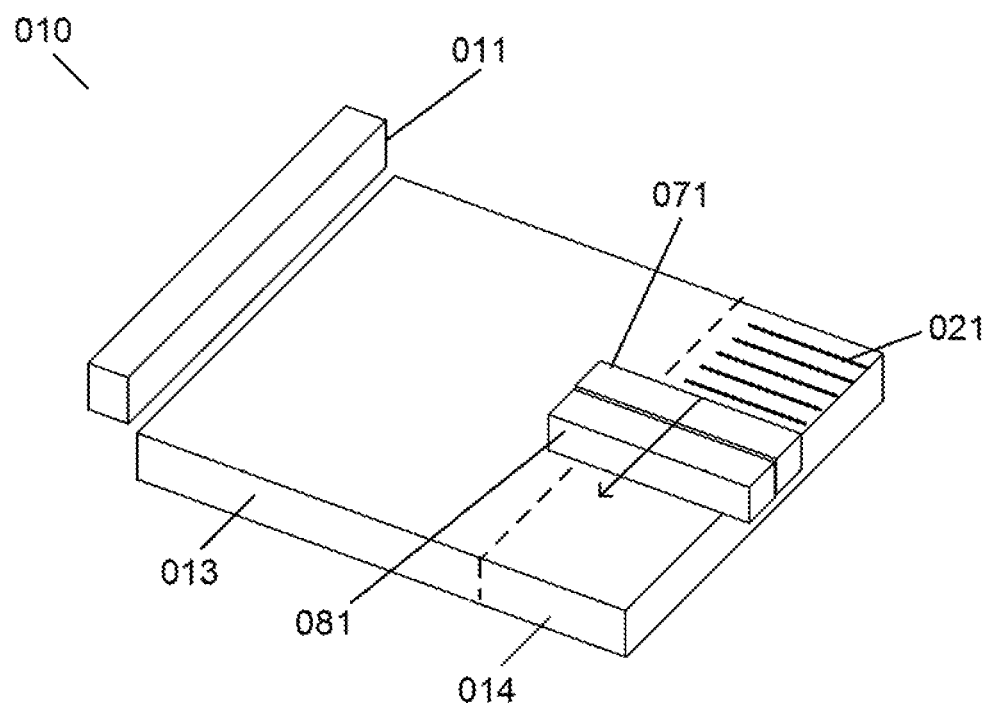
FIG. 8 schematically shows an example of a system to determine an excess of build material.

FIG. 8 schematically shows an example of a system (010) to determine an excess of build material. An example of a system (010) may comprise a carriage (not shown in FIG. 8) carrying an optical sensor (081) of the detection module (012) and a print head (071). In some examples, a carriage may carry further components of a 3D printer. The carriage may be scannable over the excess zone (014). FIG. 8 illustrates the excess zone (014) separated by dashed lines from the build platform (013) or from an area on which a layer of build material may be formed. In some examples, the carriage may extend over a dimension of the build platform (013) and may be scannable along the perpendicular dimension of the build platform (013). In some examples, such as in a page-wide implementation, the print head (071) may be an array of nozzles and/or printheads, in a so-called 'page-wide' print head assembly, with a set of nozzles to eject printing fluid over a dimension of the build platform (013) while scanning along a perpendicular dimension of the build platform (013). In some examples, the carriage may be to scan over the excess zone (014) before the build material dispensing device (011) is to form a layer of build material on the build platform (013) and may leave any excess build material on the excess zone (014). FIG. 8 schematically shows the optical sensor (081) and the print head (071) scanning over the excess zone (014) while a pattern (021) is printed on the excess zone (014) by the print head (071). In FIG. 8, an example pattern (021) is depicted showing a set of parallel lines, the lines parallel to a side of the build platform (013).

Figure 9:
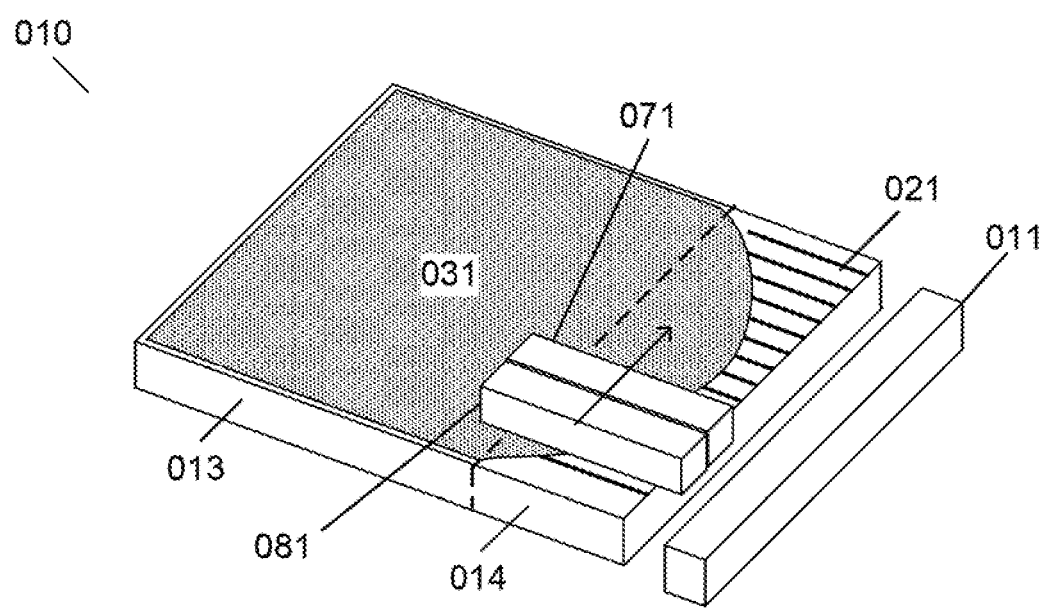
FIG. 9 schematically shows an example of a system to determine an excess of build material.

FIG. 9 schematically shows an example of a system (010) to determine an excess of build material. In some examples, the build material dispensing device (011) is to scan from a side of the build platform (013) to the opposite side of the build platform (013), so that a layer of build material (031) is formed. The build material dispensing device (011) may extend over a dimension of the build platform (013) and by scanning in one pass over the build platform (013) along a perpendicular axis, a layer of build material (031) is formed in one pass. In some examples, a build material dispensing device (011) may scan in more than one pass over the build platform (013) to form a layer of build material (031). In some examples, the carriage carrying the optical sensor (081) of the detection module (012) and the print head (071) is to scan over the excess zone (014) after the build material dispensing device (011) forms a layer of build material (031) on the build platform (013) and leaves any excess build material on the excess zone (014), as for example depicted in FIG. 9. The optical sensor (081) carried by the carriage may pass over the excess zone (014) to detect an optical signal of the printed pattern (021) on the excess zone (014) which may be covered by any excess of build material from layer (031).

Figure 10:
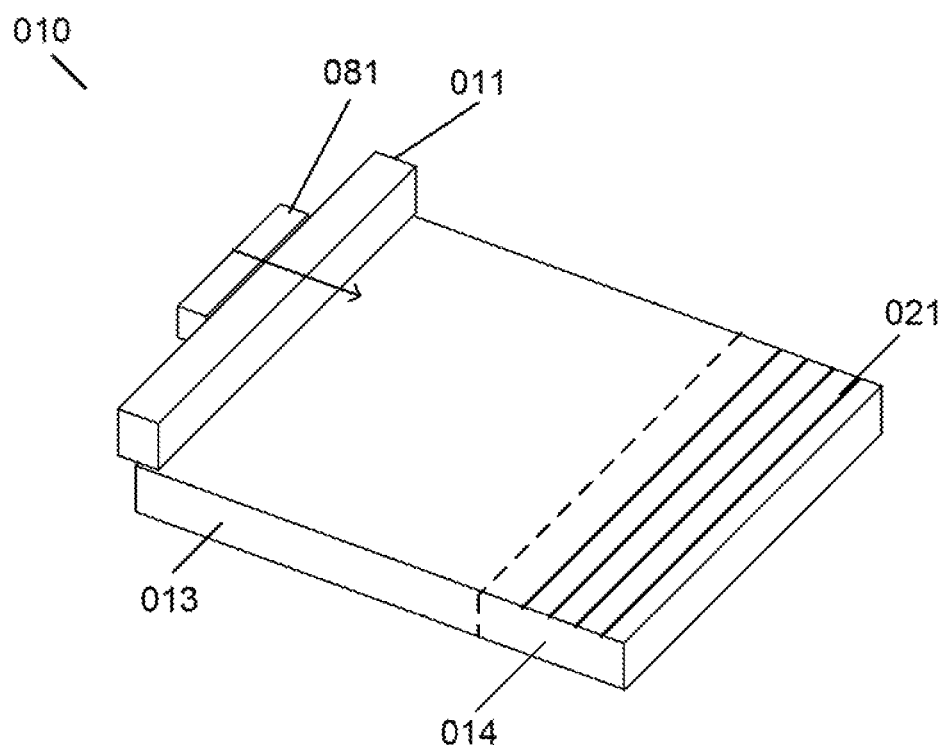
FIG. 10 schematically shows an example of a system to determine an excess of build material.
Figure 11:
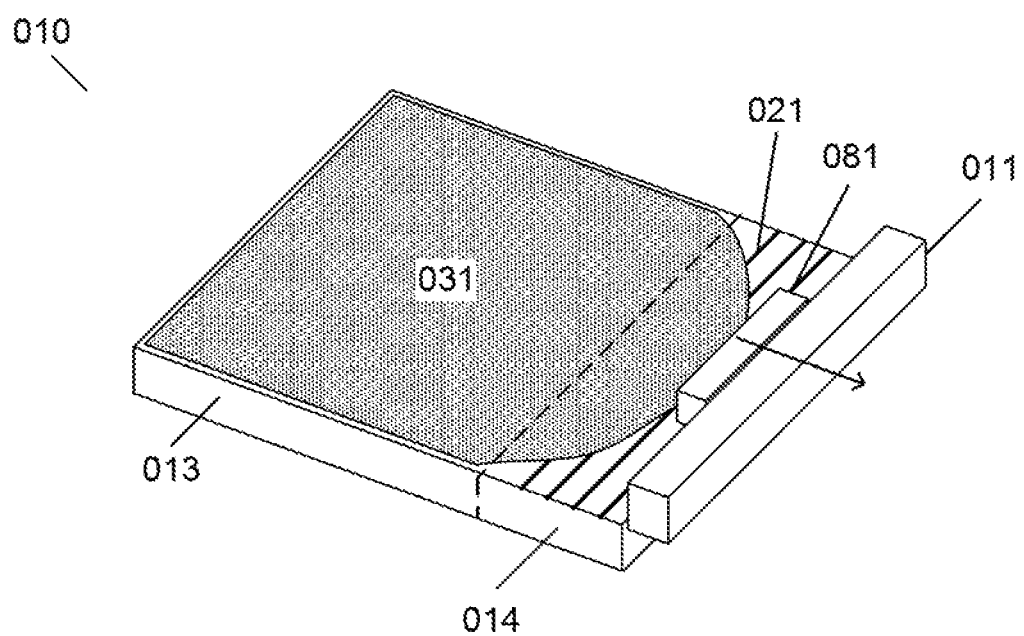
FIG. 11 schematically shows an example of system to determine an excess of build material.

FIG. 10 schematically shows an example of a system (010) to determine an excess of build material. In some examples, an optical sensor (081) of the detection module (012) may be configured at a first side of the build material dispensing device (011), so that when the optical sensor (081) moves in a first direction over the build platform (013) and the excess zone (014), the optical sensor (081) is to detect an optical signal of the provided pattern (021) after the build material dispensing device (011) has formed a layer of build material (031) and has left any excess build material on the excess zone (014). FIG. 11 schematically shows an example of system (010), wherein the build material dispensing device (011) may be scanning from a side of the build platform (013) to the opposite side of the build platform (013) while forming a layer of build material (031). As the optical sensor (081) may be attached at a the rear side or up-stream of the scanning direction of the dispensing device (011), the optical sensor (081) scans over the excess zone (014) after any excess build material may have been left thereon. In FIGS. 10 and 11, an example pattern (021) is depicted showing a set of parallel lines, the lines parallel to a side of the build platform (013).

In some examples, more than one detection module (012) or more than one optical sensor (081) may be to detect a degree of overflow, such as an array of detectors or sensors. In some examples, an optical sensor (081) may be attached at the rear and/or front side of a build material dispensing device (011) or of a carriage, such as a carriage carrying a print head (071) in FIGS. 8 and 9 or other components of a 3D printer. In some examples, an optical sensor (081) may extend over a dimension of the build platform (013) or over a dimension of the excess zone (014). In some examples, an optical sensor (081) may extend over a portion of a dimension of the build platform (013) or the excess zone (014). In some examples, an optical sensor (081) may extend over a dimension of the pattern (021) on the excess zone (014).

FIGS. 12*a*-12*f* schematically show side-views of an example of a system (010) to determine an excess of build material. In some example, a dosage device to provide an amount of build material at a side of the build platform (013) may be a supply platform (121*a*, 121*b*). In some examples, more than one supply platform (121*a*, 121*b*) may be to provide an amount of build material at more than one side, e.g. two opposite sides, of the build platform (013). A supply platform (121*a*, 121*b*) may be adjacent to a build platform (013) of a 3D printer. A supply platform (121*a*, 121*b*) may be adjustable in height within walls providing a three-dimensional space for storing build material (122*a*, 122*b*). When the supply platform (121*a*, 121*b*) increases in height relative to the build platform (013) a slab of build material may be provided at a side of the build platform (013).

Figure 12A:
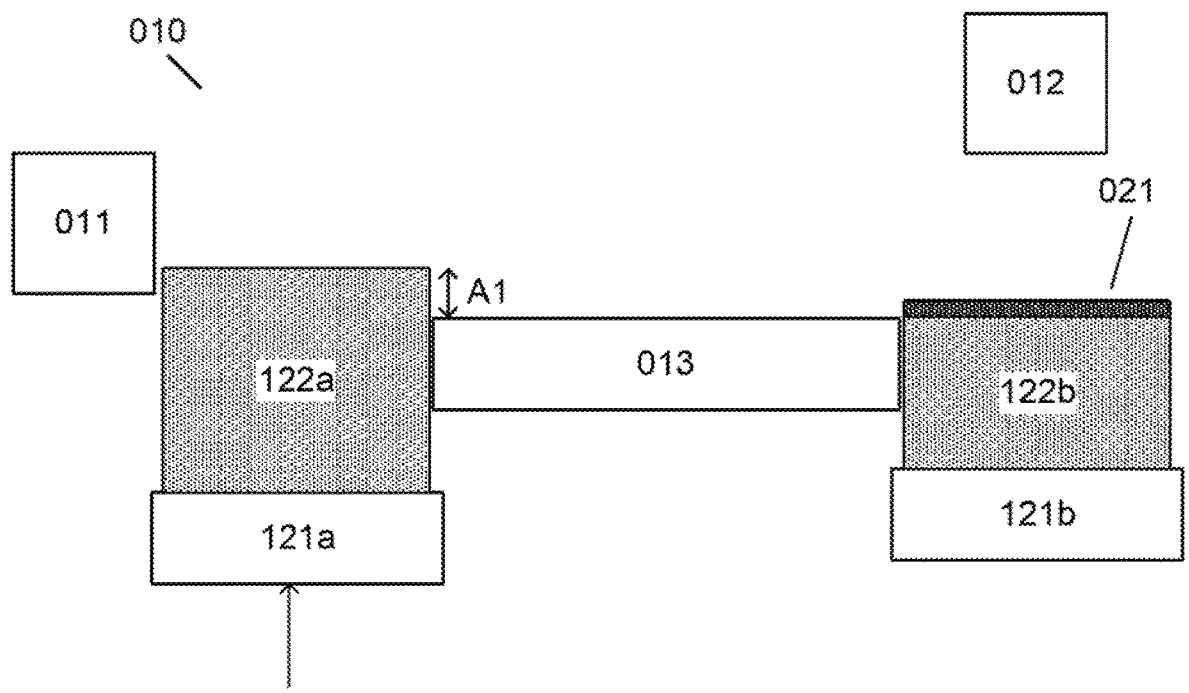
FIGS. 12a-12f schematically show examples of a system to determine an excess of build material, the system of the examples having supply platforms to provide an amount of build material.
Figure 12B:
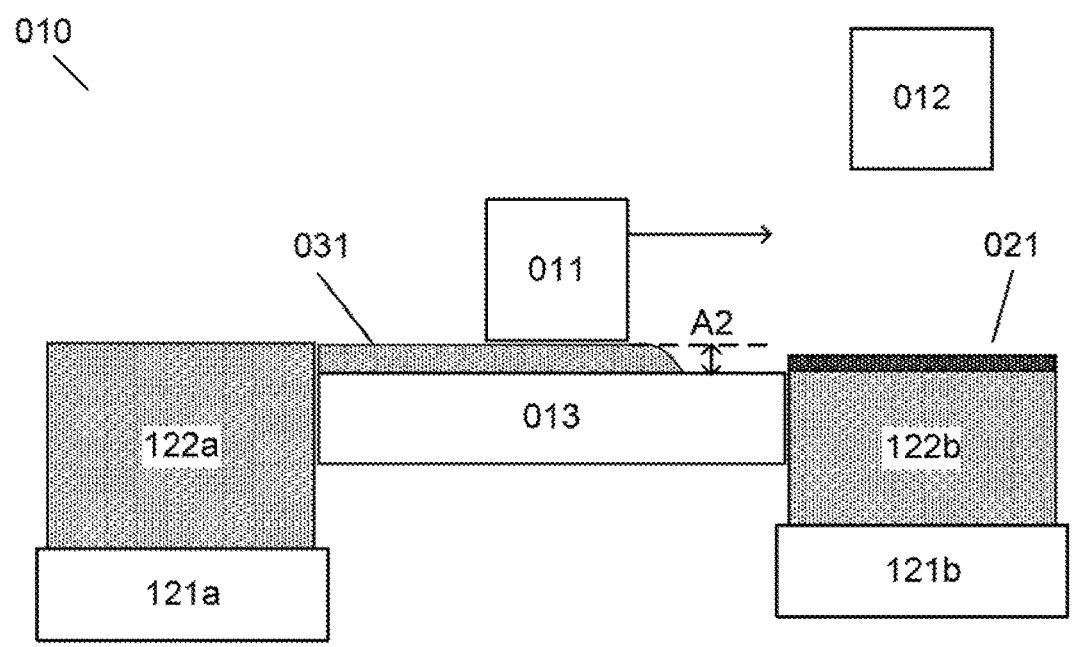

FIG. 12*a* schematically shows a supply platform (121*a*) adjacent to the build platform (013) after moving upwards by a height A1 relative to the build platform (013). In that example, a slab of build material is provided from a three-dimensional space for storing build material (122*a*). The provided slab may extend above a plane defined by the surface of the build platform (013) or a previous layer formed on the build platform (013). When the build material dispensing device (011) scans from the side of the build platform (013) to an opposite side of the build platform (013), a portion from the provided slab may be spread over the build platform (013) to form a layer of build material (031) as depicted in FIG. 12*b*. In some examples, the build material dispensing device (011) may be a roller, a blade or a vane and the thickness of the layer of build material (031) may be defined by the distance A2 of the dispensing device (011) the build platform (013) or the previous layer.

Figure 12C:
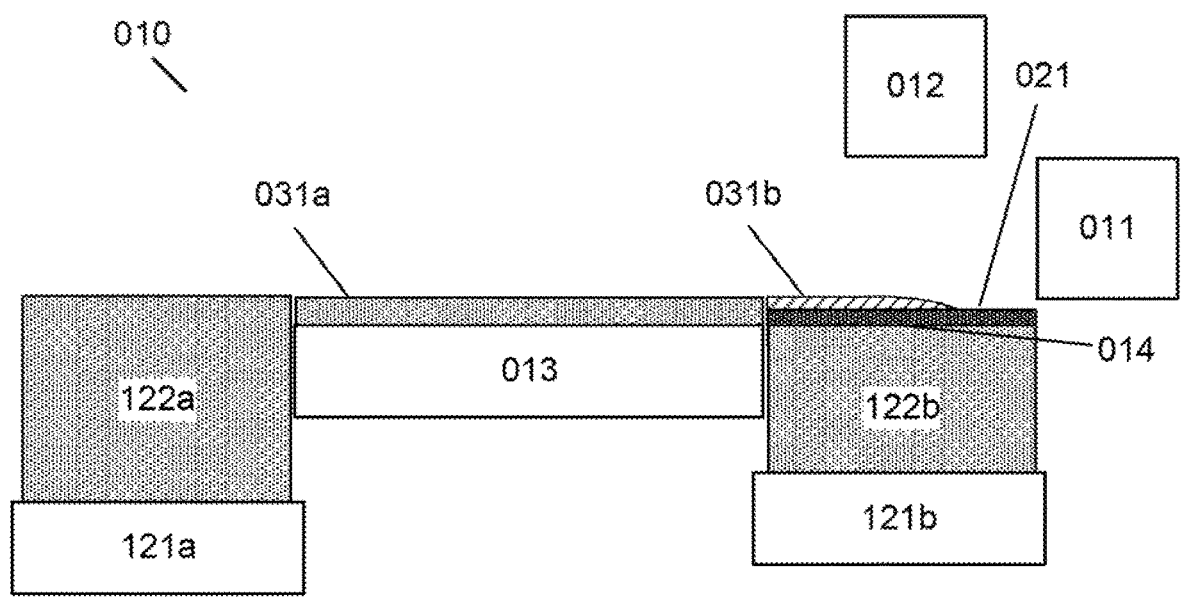

The build material dispensing device (011) may form a layer of build material (031) on the build platform (013), or on a previous layer, and may leave any excess build material (031*b*) on an excess zone (014), as illustrated in FIG. 12*c*. In an example, the excess zone (014) may be the upper surface of build material stored in a three-dimensional space (122*b*) on a supply platform (121*b*), for example on a supply platform (121*b*) on the opposite side of the build platform (013), for example as depicted in FIG. 12*c*. The excess zone (014) may be the upper surface of build material stored in a three-dimensional space (122*b*) on a supply platform (121*b*), wherein the upper surface may be planar with the top of the build platform (013) or the top surface of a previous layer. In some examples, a pattern (021) may be provided on the upper surface of build material stored in a three-dimensional space (122*b*) on a supply platform (121*b*). For example, a pattern (021) may have been printed with a print head (071), as shown in FIGS. 7*a*-7*f*. The detection module (012) may be to detect a degree of overflow of build material covering the pattern (021) on the upper surface of build material stored in a three-dimensional space (122*b*) on a supply platform (121*b*). The detection module (012) may be to determine an amount or volume of excess build material (031*b*). In some examples, a limit to define an excess of build material may be any limit defined with respect to an amount of build material on an excess zone (014) or an amount of build material forming a layer on the build platform (013).

Figure 12D:
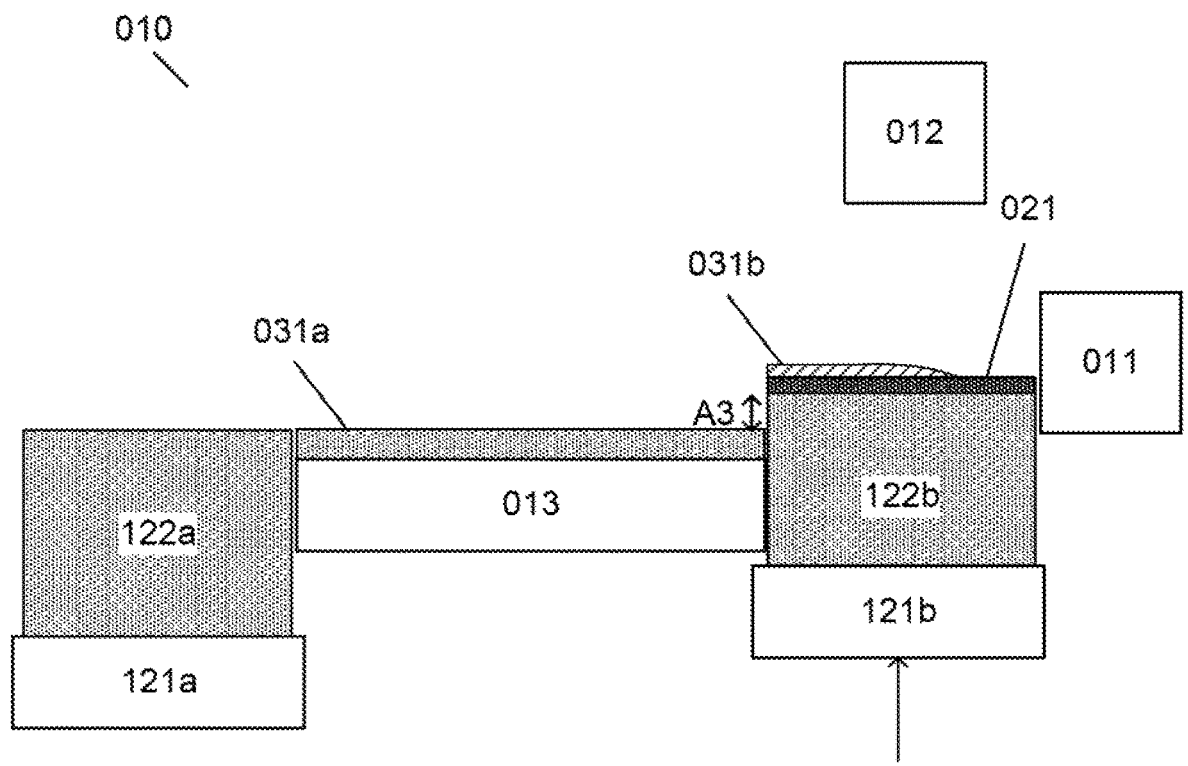

In some examples, a supply platform (121*b*), e.g. a supply platform (121*b*) on the opposite side of the build platform (013), may be controlled, such as by controller (072) in FIGS. 7*a*-7*f*, to provide an amount of build material modified based on the degree of overflow of build material on the excess zone (014). For example, as schematically depicted in FIG. 12*d*, supply platform (121*b*) may move upwards by a distance A3 relative to the build platform (013) to provide a slab of build material. The distance A3 may be based on an amount or volume of excess build material (031*b*) detected with the detection module (012). For example, a supply platform (121b) may provide more or less build material by moving upwards more or less.

Figure 12E:
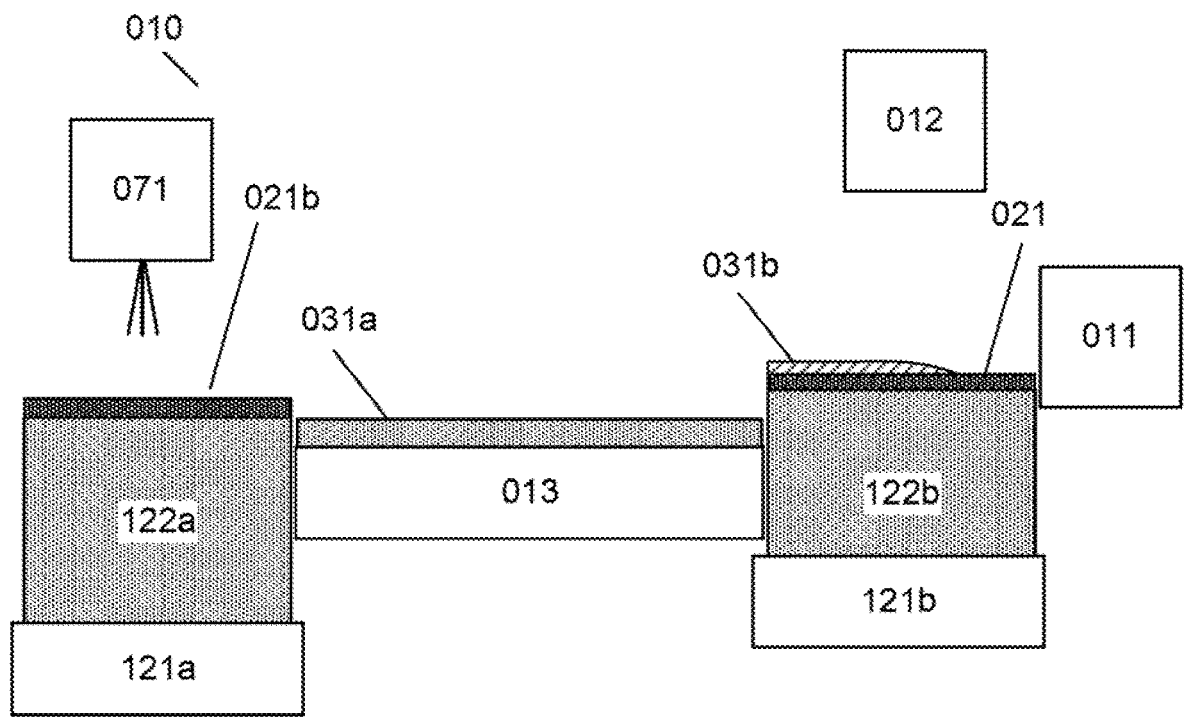
Figure 12F:
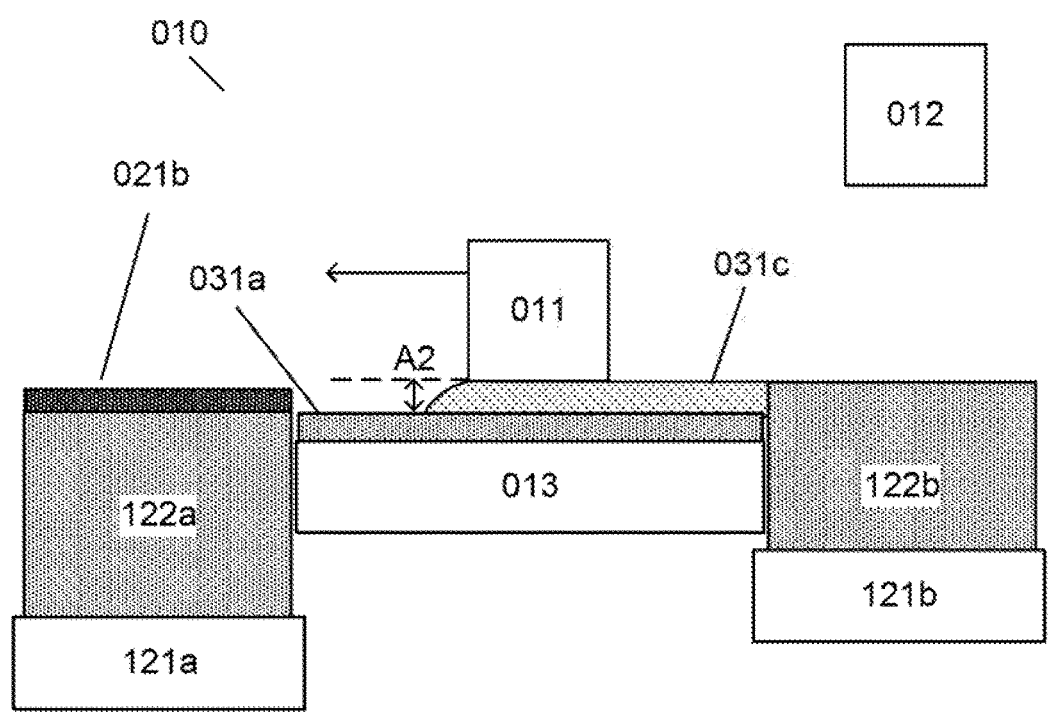

In some examples, a print head (071) may print a pattern (021b) on the upper surface of build material stored in a three-dimensional space (121a) on a supply platform (121a), e.g. the supply platform (121a) on the opposite side of the build platform (013) as schematically shown in FIG. 12e. When the build material dispensing device (011) scans, e.g. as depicted in FIG. 12f, (back) over the build platform (013), portions of build material from the provided slab and a mixture of excess build material (031b) and the pattern (021) on the slab of build material are spread over the build platform (013) to form a subsequent layer of build material (031c). In some examples, the build material dispensing device (011) may be a roller, a blade or a vane and the thickness of the layer of build material (031c) may be defined by the distance A2 of the dispensing device (011) to the build platform (013) or the previous layer of build material (031a) thereon. In some examples, the printed pattern (021) on the excess zone (014) may not unduly degrade or affect an amount of build material when the amount of build material is mixed with printing fluid forming the pattern (021) when forming a subsequent layer of build material (031c). For example, fusing or solidification properties of the layer of build material (031c) comprising build material and portions of a pattern (021), such as a printed pattern (021) with a printing fluid, may not be unduly degraded or modified.

In some examples, a build platform (013) of a 3D printer may move downwards before forming a next layer of build material on the build platform (013). For example, the most upper layer of build material on top of a build platform (013) may be at a constant height within a 3D printer. For example, selective solidification of portions of the most upper layer of build material may be achieved by selectively applying energy to portions of that layer. In some examples, a selective solidification module to apply energy may be fixed or scannable over the most upper layer of build material at a substantially constant distance to that layer.

In some examples, a system (010) to determine a degree of overflow may comprise a controller (072) as schematically shown in FIG. 13. A controller (072) may comprise circuitry to control the build material dispensing device (011) and the detection module (012). In some examples, the controller (072) may comprise circuitry to control a build platform (013) or further components of a 3D printer or a system (010). In some examples, the controller (072) may comprise circuitry to control a print head (071) to print a pattern (021) on an excess zone (014). A controller (072) comprises a processor (132) having any appropriate circuitry capable of processing (e.g. computing) instructions, such as one or multiple processing elements, e.g. a central processing unit (CPU), a graphical processing unit (GPU), a semiconductor-based micro-processor, a programmable logic device (PLD), or the like. Processing elements may be integrated in single device or distributed across devices. A controller (072) comprises a machine-readable storage medium (133) comprising instructions (134) to control the system (010) and to determine an excess of build material. The computer readable storage medium (133) may comprise volatile, e.g. RAM, and non-volatile components, e.g. ROM, hard disk, CD-ROM, flash memory, etc., and may be an electronic, magnetic, optical, or other physical storage device that is capable of containing (i.e. storing) executable instructions (134). A storage medium (133) may be integrated in the same device as the processor (132) or it may be separate but accessible to the processor (132). The instructions (134) comprise instructions executable by the processor (132) and the instructions (134) may implement a method to determine excess build material.

For example, the instructions (134) may comprise instructions to control a build material dispensing device (011) to spread an amount of build material over a build area of a 3D printer and to leave any excess build material on an excess zone (014) with a visible pattern (021) provided thereon, to control an optical sensor (015) to measure optical properties from the excess zone (014), wherein excess build material covering the pattern (021) on the excess zone (014) has a different optical property than the pattern (021) not covered with any build material, to determine from the measurement an excess amount of build material overflowing onto the excess zone (014) and to modify an amount of build material to be provided for spreading a next layer of build material based on the determined excess amount.

Figure 14:
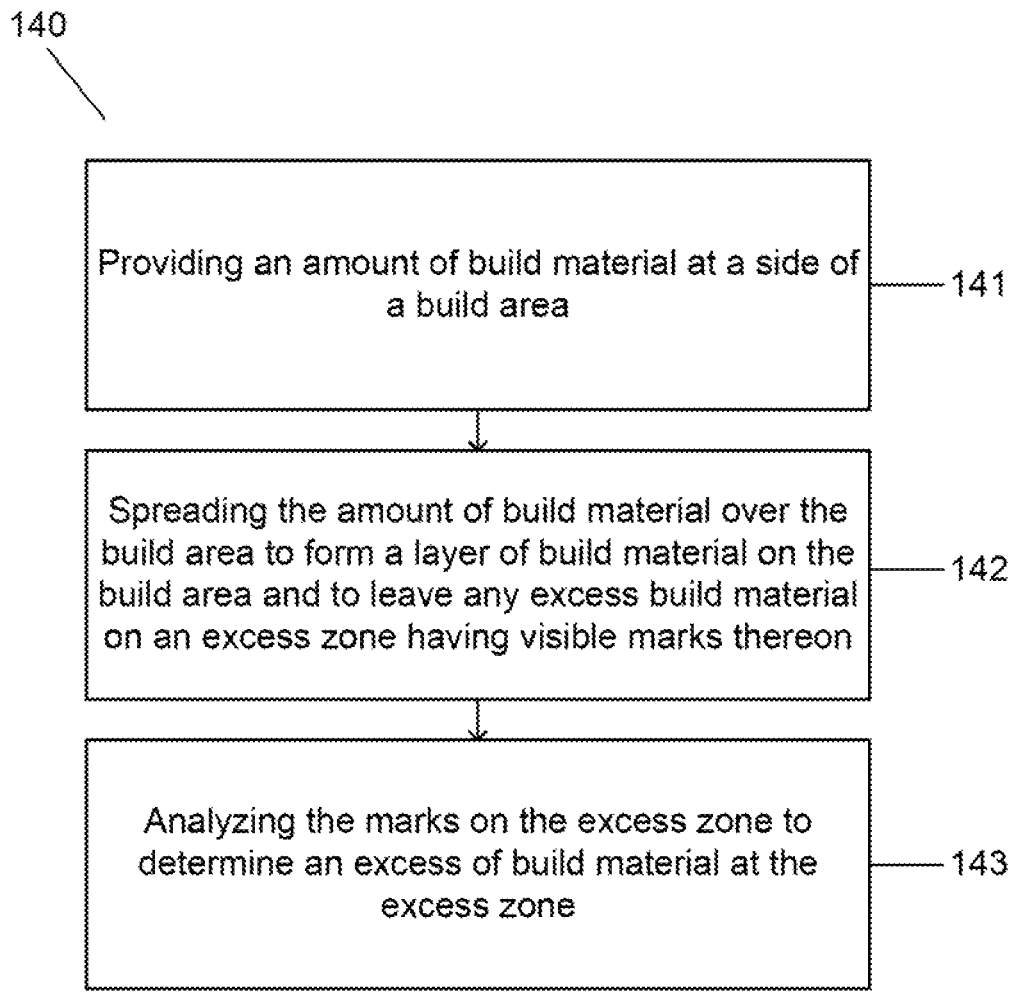
FIG. 14 shows a flow diagram of an example of a method to determine excess of build material.

FIG. 14 shows a flow diagram of an example of a method (140) to determine an excess of build material. A method (140) to determine an excess of build material may be implemented as instructions (134) as shown in FIG. 13 and may be performed by a system (010) to determine an excess of build material. The method comprises providing an amount of build material at a side of a build area (141), such as at a side of a build platform or at a side of an upper layer of build material on the build platform. In some examples, build material may be provided by a dosage device, e.g. a supply platform as depicted in FIGS. 12a-12f, a hopper, a vane or another dosage device of a 3D printer.

Figure 15:
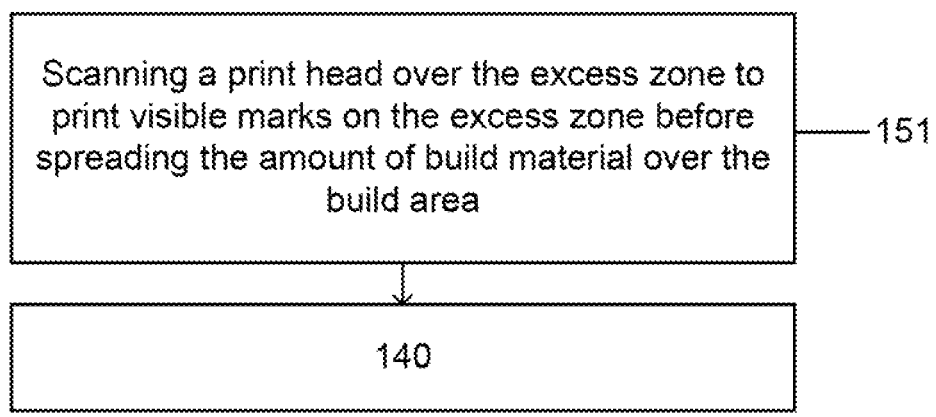
FIG. 15 shows a flow diagram of an example of a method to determine excess of build material.

Further the method (140) comprises, spreading the amount of build material over the build area to form a layer of build material on the build area and to leave any excess build material on an excess zone having visible marks thereon (142). Visible marks may comprise a set of separate lines on the excess zone, and the lines may comprise at least one of lines parallel to a side of the build area, lines perpendicular to a side of the build area and lines inclined by an angle with respect to a side of the build area or a side of the excess zone, e.g. patterns (021a-021f) as illustrated in FIGS. 7a-7f. In some examples, the visible pattern may be printed by a print head, e.g. print head (071), when scanning the print head over the excess zone before spreading the amount of build material over the build area to form a layer of build material (151) as shown in flow diagram of FIG. 15. In some examples, the excess zone is a surface of build material stored on a supply platform and the printer is to print the marks on that surface, e.g. as illustrated in FIG. 12e.

Figure 16:
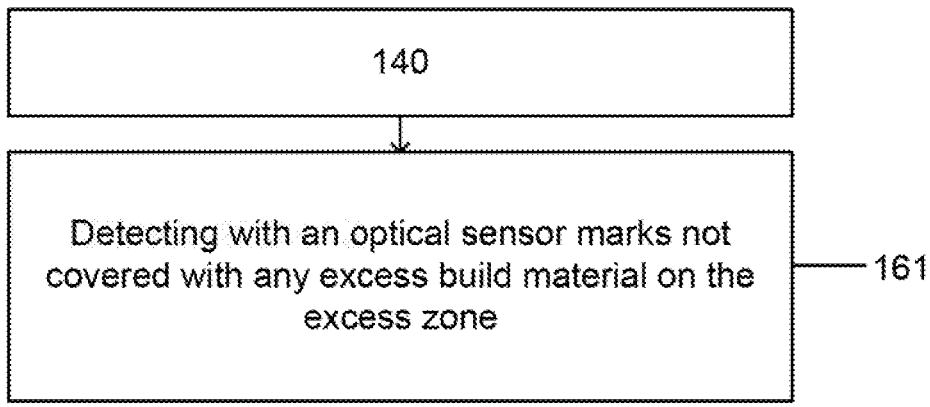
FIG. 16 shows a flow diagram of an example of a method to determine excess of build material.
Figure 17:
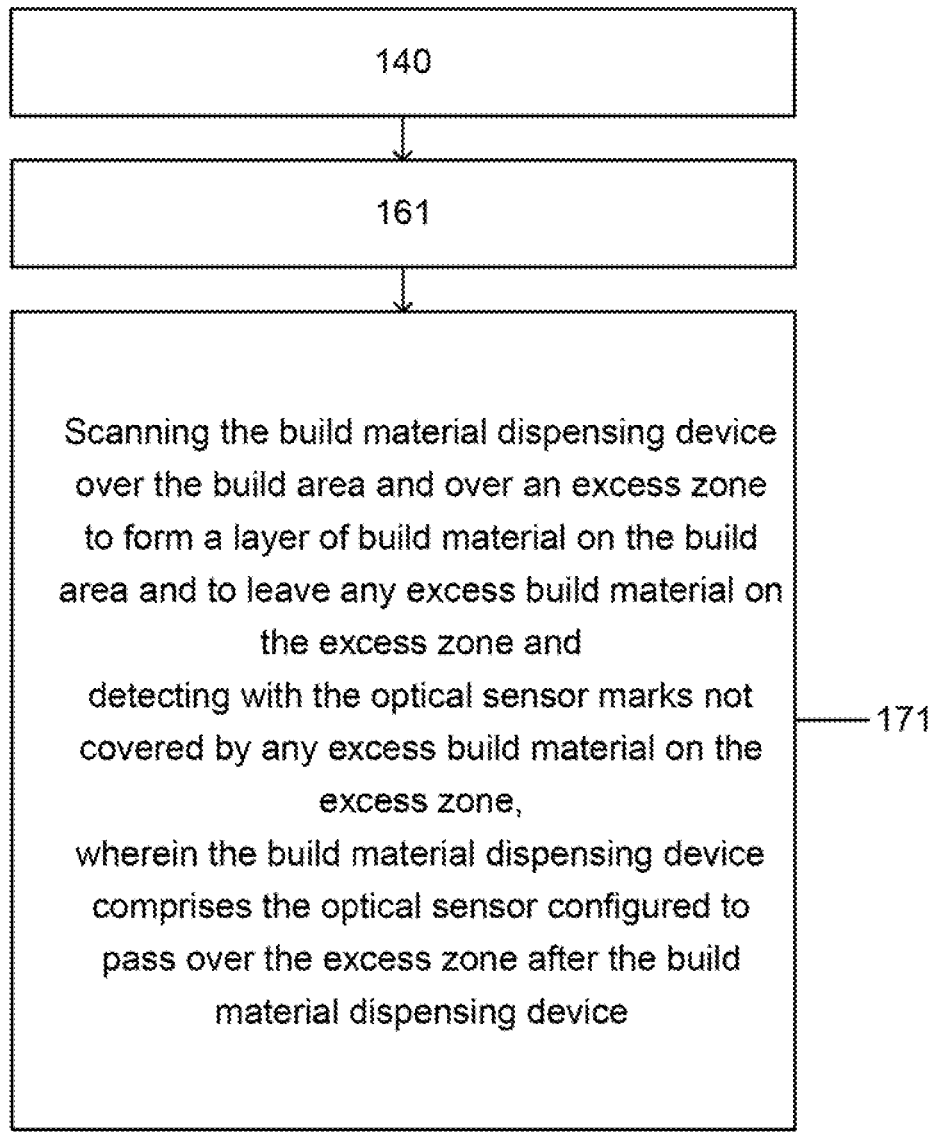
FIG. 17 shows a flow diagram of an example of a method to determine excess of build material.

Further the method (140) comprises, analyzing the marks on the excess zone to determine an excess of build material at the excess zone (143). For example, analyzing may comprise detecting with an optical sensor marks not covered with any excess build material on the excess zone (161), as shown in the flow diagram of FIG. 16. FIG. 17 shows a flow diagram of an example of a method (140) to determine an excess of build material, the example of the method (140) further comprising scanning the build material dispensing device over the build area and over an excess zone to form a layer of build material on the build area and to leave any excess build material on the excess zone and detecting with the optical sensor marks not covered by any excess build material on the excess zone, wherein the build material dispensing device comprises the optical sensor configured to pass over the excess zone after the build material dispensing device (171), e.g. as illustrated in FIGS. 10 and 11. The optical sensor may be attached at a rear side of the build material dispensing device, up-stream to the scanning direction. Thereby, the build material dispensing device may form a layer of build material on the build area and may leave any excess build material on the excess zone, and the optical sensor attached at a rear side may detect marks not covered by any excess build material on the excess zone.

Figure 18:
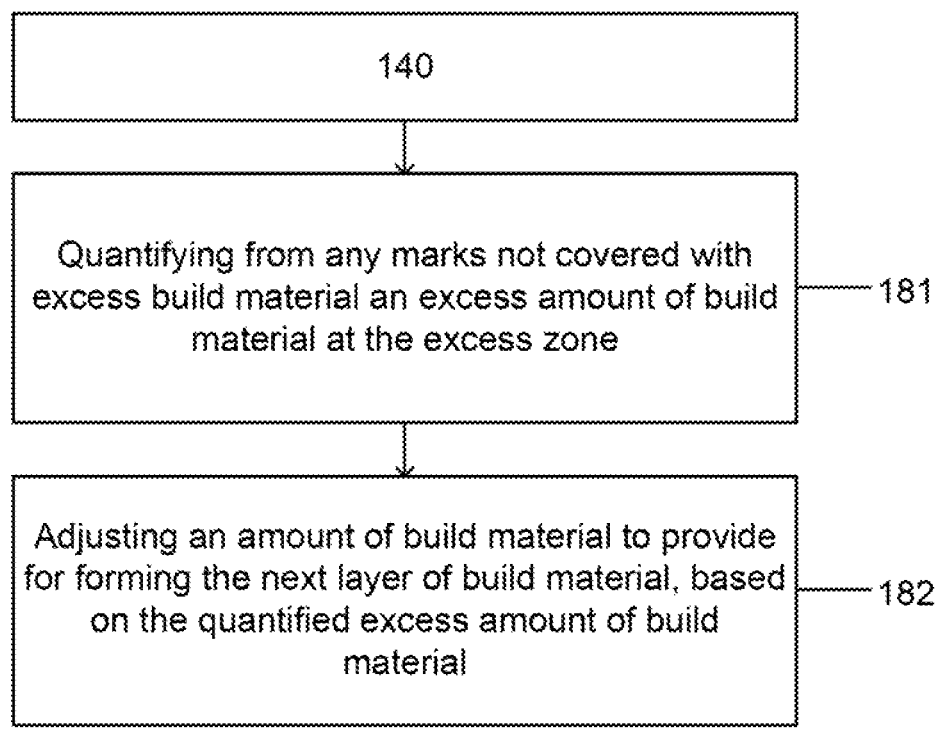
FIG. 18 shows a flows a flow diagram of an example of a method to determine excess of build material.

In some examples, the method (140) further comprises quantifying from any marks not covered with excess build material an excess amount of build material at the excess zone (181). In some examples, the method (140) further comprises adjusting an amount of build material to provide for forming the next layer of build material, based on the quantified excess amount of build material (182), as shown in the flow diagram of FIG. 18. For example, a dosage device may be controlled to provide an adjusted amount of build material, such as a supply platform depicted in FIGS. 12a-12f.

The following terminology is understood to mean the following when recited by the description or the claims. The word "comprising" does not exclude the presence of elements other than those listed, the word "including" or "having" does not exclude the presence of elements other than those listed, "a", "an" or "the" does not exclude a plurality and a "series" or "plurality" does not exclude a singularity. The words "or" and "and" have the combined meaning "and/or" except combinations of listed features where at least some of such features and/or elements are mutually exclusive within the context.

All of the features disclosed in the claims and description (including drawings), and/or all of the elements of any method or process so disclosed, may be combined in any combination and order, except combinations where at least some of such features and/or elements are mutually exclusive.

The invention claimed is:

1. A method to detect an excess of build material in 3D printing comprising:
   providing an amount of build material at a side of a build area;
   spreading the amount of build material over the build area to form a layer of build material on the build area and to leave any excess build material on an excess zone having visible marks thereon; and
   analyzing the visible marks on the excess zone to determine an excess of build material at the excess zone.

2. The method of claim 1, further comprising:
   scanning a print head over the excess zone to print visible marks on the excess zone before spreading the amount of build material over the build area.

3. The method of claim 2, wherein
   the excess zone is a surface of build material stored on a supply platform.

4. The method of claim 1, further comprising:
   quantifying from any marks not covered with excess build material an excess amount of build material at the excess zone; and
   adjusting an amount of build material to provide for forming the next layer of build material, based on the quantified excess amount of build material.

5. The method of claim 1, further comprising:
   detecting with an optical sensor marks not covered with any excess build material on the excess zone.

6. The method of claim 5, wherein
   a build material dispensing device comprises the optical sensor configured to pass over the excess zone after the build material dispensing device, and
   wherein the method further comprises:
   scanning the build material dispensing device over the build area and over an excess zone to form a layer of build material on the build area and to leave any excess build material on the excess zone; and
   detecting with the optical sensor marks not covered by any excess build material on the excess zone.

7. The method of claim 1,
   wherein the visible marks comprise at least one set of separate lines on the excess zone, and
   wherein the lines of a set of lines comprise at least one of lines parallel to a side of the build area, lines perpendicular to a side of the build area and lines inclined by an angle to a side of the build area.

8. A system comprising:
   a build material dispensing device to spread a layer of build material on a build platform of a 3D printer and to cause any excess build material to overflow onto an excess zone; and
   a detection module to detect a degree of overflow of build material covering a pattern provided on the excess zone.

9. The system of claim 8, further comprising:
   a controller to control a print head to print the pattern on the excess zone.

10. The system of claim 8, further comprising:
    a dosage device to provide an amount of build material, so that the build material dispensing device can spread the provided amount of build material over the build platform,
    wherein the dosage device is controlled to provide an amount of build material modified based on the degree of overflow of build material on the excess zone.

11. The system of claim 8, further comprising:
    an optical line sensor to detect parallel lines of the provided pattern on the excess zone; and
    a controller to quantify an excess volume of build material on the excess zone based on the detected lines by the optical line sensor.

12. The system of claim 8, further comprising:
    a carriage carrying an optical sensor of the detection module and a print head,
    wherein the carriage is to scan over the excess zone before the build material dispensing device formed the layer of build material on the build platform and left any excess build material on the excess zone, so that the print head can print a pattern on the excess zone, and
    wherein the carriage is to scan over the excess zone after the build material dispensing device formed the layer of build material on the build platform and left any excess build material on the excess zone, so that the optical sensor passes over the excess zone to detect an optical signal of the printed pattern on the excess zone.

13. The system of claim 8, further comprising:
    an optical sensor of the detection module configured at a first side of the build material dispensing device, so that when the sensor moves in a first direction over the build area and the excess zone, the optical sensor is to detect an optical signal of the provided pattern on the excess zone after the build material dispensing device has formed a layer of build material on the build platform and has left any excess build material on the excess zone.

14. The system of claim 8, further comprising:
    at least one supply platform adjacent to the build platform of a 3D printer, the supply platform adjustable in height within walls providing a three-dimensional space for storing build material, so that when the supply platform increases in height relative to the build platform a slab of build material is provided at a side of the build platform, wherein the build material dispensing device is to spread a slab of build material provided by a supply platform, and wherein the excess zone is the upper surface of build material stored in a three-dimensional space on a supply platform, the upper surface planar with the build platform over which an amount of build material is to be spread.

15. A non-transitory computer readable storage medium comprising instructions that, when executed by a processor, cause the processor to:

control a build material dispensing device to spread an amount of build material over a build area of a 3D printer and to leave any excess build material on an excess zone with a pattern provided thereon;

control an optical sensor to measure optical properties from the excess zone, wherein excess build material covering the pattern on the excess zone has a different optical property than the pattern not covered with any build material;

determine from the measurement an excess amount of build material overflowing onto the excess zone; and modify an amount of build material to be provided for spreading a next layer of build material based on the determined excess amount.

* * * * *